United States Patent [19]

Padberg, Jr. et al.

[11] 4,213,198
[45] Jul. 15, 1980

[54] METHOD FOR CLASSIFICATION OF SONAR ECHOES

[75] Inventors: Louis R. Padberg, Jr., San Diego, Calif.; Frederick D. Parker, late of San Diego, Calif., by Mrs. Frederick D. Parker, executrix; Carl L. Schaniel, Jr., San Diego, Calif.; Kenneth D. Kleager, La Mesa, Calif.

[73] Assignee: The United States of America as represented by the Secretary of the Navy, Washington, D.C.

[21] Appl. No.: 516,808

[22] Filed: Jun. 20, 1955

[51] Int. Cl.² .............................................. G01S 9/68
[52] U.S. Cl. .................................... 367/113; 367/115
[58] Field of Search .................... 340/3; 35/10.2, 10.4, 35/25; 343/17; 367/87, 113, 115

[56] References Cited

U.S. PATENT DOCUMENTS

| 2,391,633 | 12/1945 | Korn | 367/115 |
| 2,426,189 | 8/1947 | Espenschied | 367/113 X |
| 2,757,354 | 7/1956 | Bolzman | 367/113 |

FOREIGN PATENT DOCUMENTS

| 890618 | 4/1954 | Fed. Rep. of Germany | 340/3 |
| 911824 | 5/1954 | Fed. Rep. of Germany | 340/3 |
| 637296 | 5/1950 | United Kingdom | 340/3 |

*Primary Examiner*—Richard A. Farley
*Attorney, Agent, or Firm*—R. S. Sciascia; E. F. Johnston; G. E. Pearson

EXEMPLARY CLAIM

1. A method for distinguishing between submarine and non-submarine sonar targets comprising the steps of producing a series of permanent displays of sonar target echoes having fixed electrical characteristics by projecting a beam of energy pulses of more than one and less than ten milliseconds duration toward a known submarine target of predetermined range along a number of converging paths, then transmitting a succession of energy pulses of the same duration toward an unknown target along a number of converging paths, producing successive signals of durations which successively vary in accordance with the extent of said target along consecutive pulse paths, indicating the maximum and minimum signal duration, and gating a series of sonar echo displays responsive to the same electrical characteristics as those producing the permanent displays, of said unknown target between said maximum and minimum signal duration whereby a homologous echo production of the permanent displays is obtained only when said echo is from said submarine type.

5 Claims, 9 Drawing Figures

INCIDENT SOUND

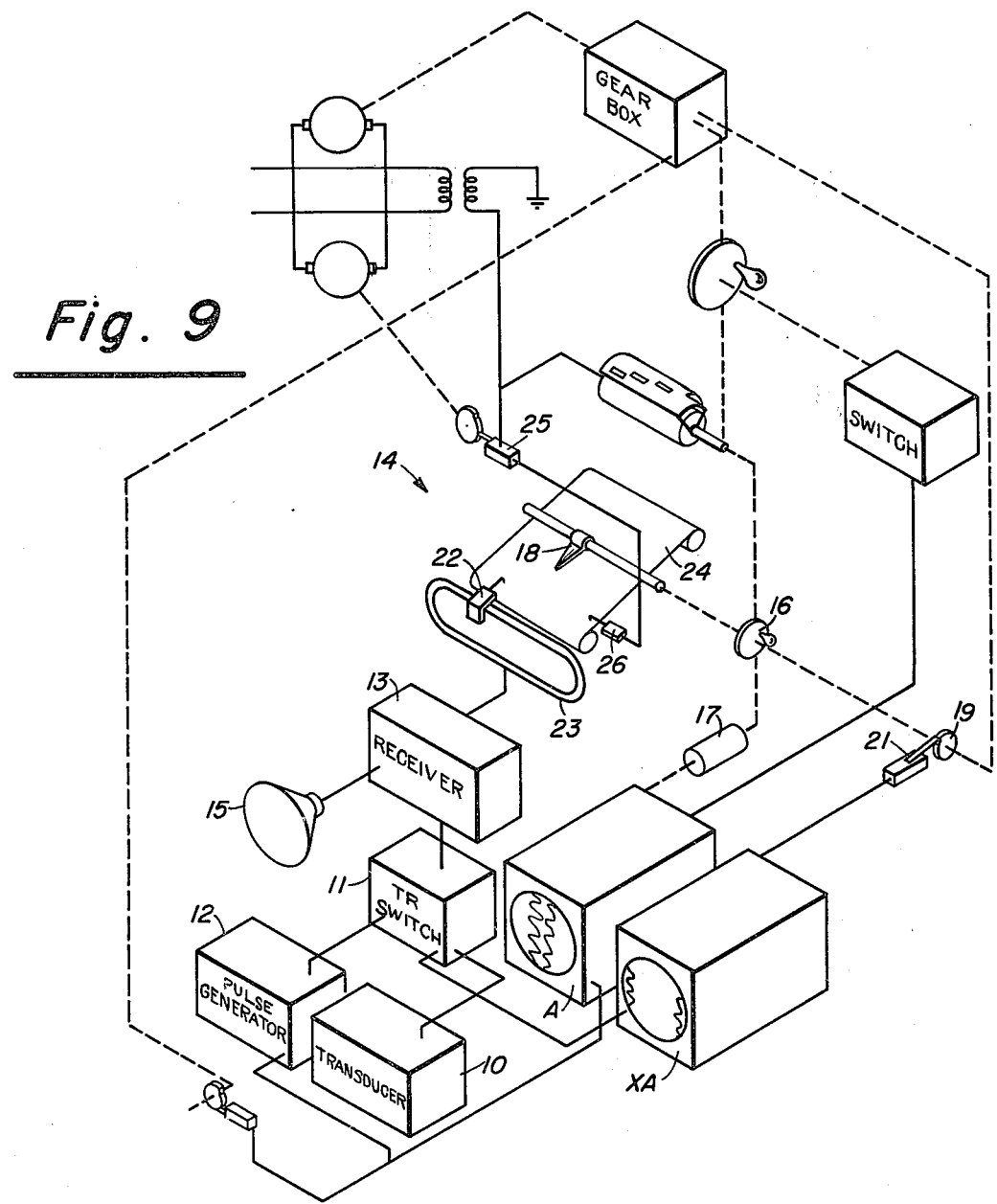

METHOD FOR CLASSIFICATION OF SONAR ECHOES

The invention described herein may be manufactured and used by or for the Government of the United States of America for government purposes without the payment of any royalties thereon or therefor.

This invention relates to a method for determining physical characteristics and orientation of sonar targets and more pariticularly to a sonar method for distinguishing between submarine and non-submarine echoes.

The problem of false sonar contacts has been rated by the Navy as one of the most vexing problems facing the fleet ASW forces. On the basis of World War II experience and the data obtained by experimental groups and fleet exercises since that time, between 50 and 90 percent of all contacts obtained by conventional surface ship sonar have been classified "false" in the sense that they were later assessed as resulting from reel or non-real targets other than submarines. That this is a serious problem is given even further support by the fact that in approximately 50 percent of these cases, the false contact was considered sufficiently convincing to justify an all-out attack on the supposed submarine.

For many years the problem of recognizing whether a sonar contact was on a submarine or some other target has been a baffling one. On the ability of the ear to classify echoes has rested the main burden of recognition. The operator's problem is made difficult because various submerged targets give a rather similar aural effect. If the target is in motion, an experienced sonarman is aided in his recognition problem by doppler effect. If, however, the target is hovering or barely moving the problem is more complicated.

The method of this invention provides accurate visual identification of a sonar target as submarine or non-submarine by presenting for visual inspection acoustic echoes which are obtained in such a manner as to yield echo structures which may be clearly identified with known physical characteristics of the target. A beam of energy pulses of critical length is projected toward the target along a succession of angularly related paths converging on the target and expanded echo displays are presented on a display device which has been gated at the target range. The lengths of the displayed echoes obtained along different paths and structure of individual echoes provide the desired information.

It is an object of this invention to provide a method for identifying an underwater object.

A further object of this invention is the provision of a method for accurately and visually distinguishing between different underwater echo sources.

A further object of this invention is to provide a method for determining physical characteristics and orientation of a sonar target.

Still another object of this invention is the provision of a visual method for identifying a sonar target as submarine or non-submarine.

Other objects and many of the attendant advantages of this invention will be readily appreciated as the same becomes better understood by reference to the following detailed description when considered in connection with the accompanying drawings wherein:

FIG. 9 is a schematic sketch showing particularly the coupling between the recorder and expanded oscilloscope to illustrate one form of apparatus adapted for practicing the method of this invention.

Marked echo highlights which can be correlated directly with the outer structure of the submarine have been found by combining a fast sweep oscilloscope echo presentation with the high power short pulse sonar. Positive classification of submarine echoes at bow and stern aspects is thereby possible. Long sequences of echoes with three highlights appear in which these highlights correspond to the areas about the bow planes, conning tower, and stern control surfaces of the submarine. A distinctive shadowing of the third highlight occurs precisely at bow and stern aspects. Beam echoes are classifiable from their sharp, narrow structure and can be confirmed by the appearance of the surface-reflected echo when the submarine is submerged below periscope depth. The echo duration undergoes a cyclic variation from a maximum length near bow to a minimum at beam and then back to a maximum near stern. The combination of this information with echo structure patterns at intermediate aspects offers submarine echo classification regardless of aspect.

Figure 1:
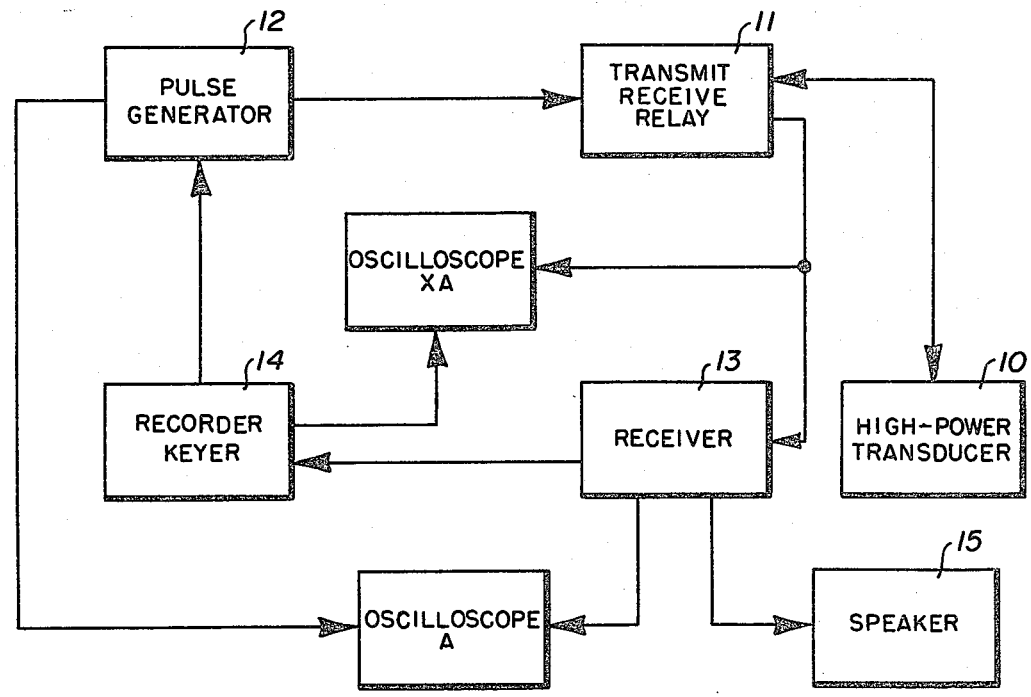
FIG. 1 is a block diagram of one form of the equipment with which the method of this invention may be practiced.

Equipment for practicing the method of this invention may comprise any conventional sonic echo ranging apparatus on board a ship having suitably large scale displays of non-heterodyned echoes and capable of transmitting pulses of sufficient minimum length. A preferred form of such equipment is shown in FIG. 1 and is described with more particularity in the co-pending application of L. R. Padberg, Jr. et al for Improved Echo Ranging System, Ser. No. 504,390, filed Apr. 27, 1955. This system includes a projecting and receiving transducer 10 which is fed through a transmit receive relay 11 with high power fixed carrier frequency pulses of a selectively variable length generated by a recorder keyed pulse generator 12. A long range slow sweep oscilloscope A is keyed by the pulse generator and provides a display of echoes which are received by the transducer 11 and passed through the transmit receive relay 11 to the filtering and heterodyning receiver 13. The latter feeds amplified echoes to the recorder keyer 14, speaker 15 and oscilloscope A which are utilized for direction and range finding, the transducer being fixed in the direction of sound propagation and its orientation with respect to the ship being known. A fast sweep oscilloscope XA which is gated by the recorder keyer 14 to produce an expanded display of an echo at a selected range is fed with echoes at carrier frequency, bypassing the receiver 13. The pulse generator 12 may selectively produce many different pulse lengths from less than one millisecond to more than 100 milliseconds duration. A stylus 22 carried by track 23 contacts chemically treated recording paper 24 which is cyclically controlled by time switch 25 as indicated by time stylus 26. Thus one means for carrying out the second step of the method is illustrated in FIG. 9 which accomplishes the step of determining the shortest echo and producing a surface echo at beam aspect. Rotation of cursor control knob 16 varies the output of potentiometer 17 to produce a range indication on scope A in accordance with the range selected by the position of the target or cursor 18. Cam 19 causes switch 21 to be opened and closed for predetermined parts of each revolution of the cam, to gate the display of scope XA whereby the display exists only when the switch 21 is closed. A preferred form of such equipment is shown in FIG. 9 and is described with more particularity as FIG. 7 of the copending application of Frederick D. Parker et al for Echo Ranging Recording Apparatus, Ser. No. 493,586, filed Mar. 10, 1955, now U.S. Pat. No. 2,892,666. Oscilloscope XA incorporates its own non-heterodyning amplifier whereby a display of echoes at the carrier frequency is provided and affords means for observation and measurement of detailed echo structure.

A submarine hull is a large substantially cylindrical object with many protrusions, some of which are excellent reflectors of sound. The over-all submarine echo is made up of several small echoes. It has been found that if pulse lengths of 10 milliseconds or more are used the echo structure tends to smear into a single elongated echo. If pulse lengths of less than 1 millisecond are used the individual echoes from both major and minor protuberances cause the echo structure to be too full of spikes for easy recognition of any echo highlights. With a pulse length between these limits, certain major submarine features are presented as a clearly recognizable pattern.

Figure 2:
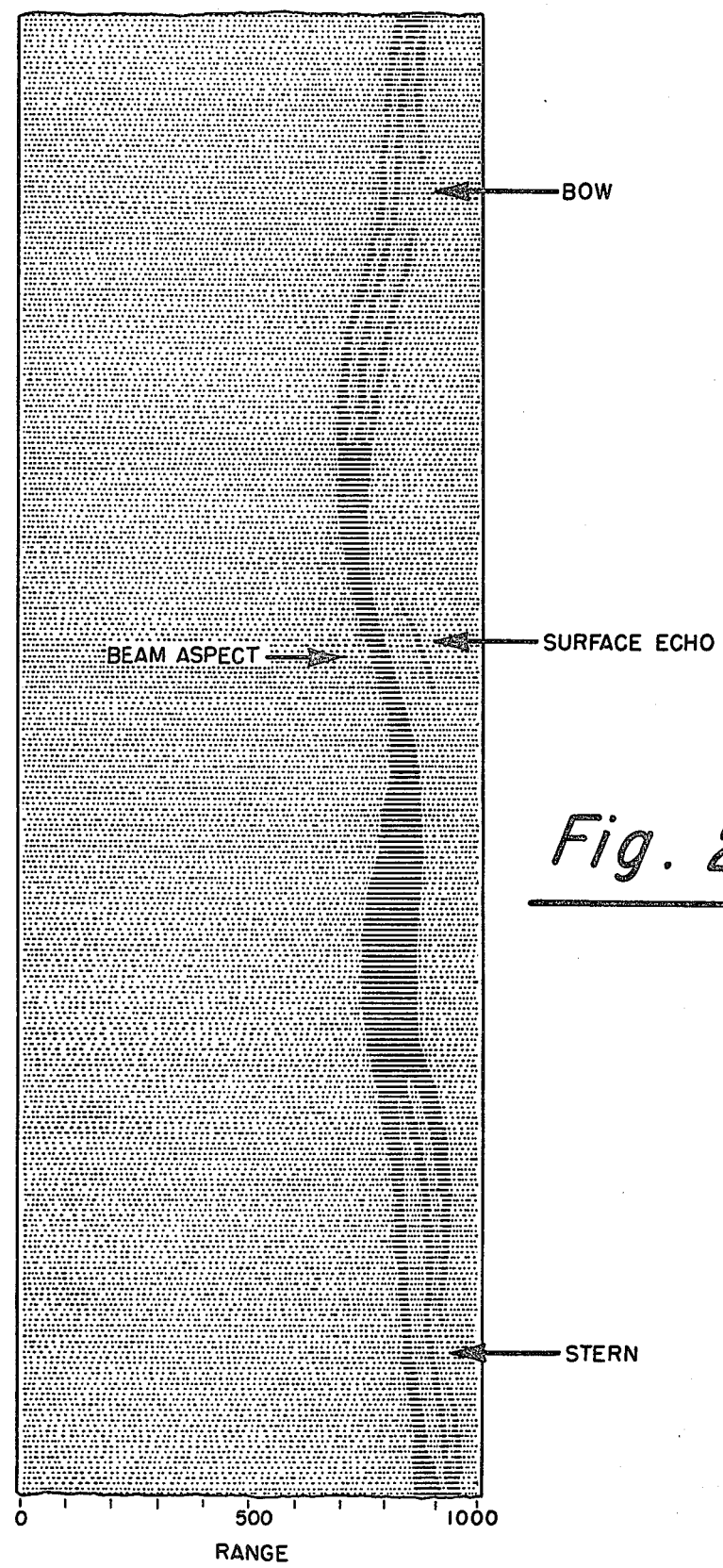
FIG. 2 shows the echoes appearing on an echo ranging recorder.

The typical range recorder presentation of a submarine track shown in FIG. 2 contains part of a circling run during which the submarine hovered while the echo ranging ship circled it. This sequence shows half of a circle going from bow to beam to stern. As bow is approached the broad echo breaks up into two traces, but directly at bow the second trace disappears, leaving only a shortened echo. The pattern is completed once bow is passed as the second trace reappears and then blends in to form a solid echo again. Approaching beam, the echo length shortens until it reaches a minimum precisely at beam. The reverse of this pattern then occurs and the echo grows longer as stern aspect is approached. Right at stern there is, again, a shortening of the echo in somewhat the same manner as at bow.

Figure 3:
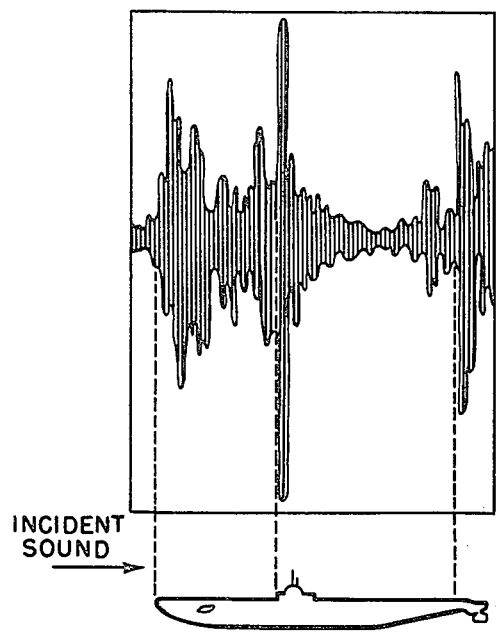
FIGS. 3–7 illustrate expanded oscilloscope displays on scope XA of submarine echoes.

The oscilloscope trace of FIG. 3 shows an echo of a single transmitted pulse observed just a few degrees off bow aspect. This definition of its structure shows the information which may be hidden when using only a recorder presentation. The sweep speed of the scope has been carefully timed, so that an accurate model of the submarine could be drawn to the same scale and then compared with the echo. Since this oscillograph trace was recorded at approximately bow aspects, the incident sound struck first the bow of the submarine and then successively each section along its entire length. Thus the part of the echo contributed by any single section along the length of the submarine is shown here directly above that portion of the model. This echo is distinctly made up of three main parts or highlights which respectively correspond directly to the areas about bow, the conning structure, and the area containing the stern control surfaces. The position of the center highlight is important and at bow it is much closer to the start of the echo than the end. This is due, of course, to the positioning of the conning structure, which begins about one third of the submarine's length back from the bow, on fleet-type-submarines. This echo structure pattern has been observed and recorded on film and it is found only within a sector of about 15° centered upon the bow. This pattern itself is so striking that it takes little training to recognize it. Once it develops, the pattern continues uninterrupted through this sector and unmistakably indicates the vicinity of bow aspect.

Figure 4:
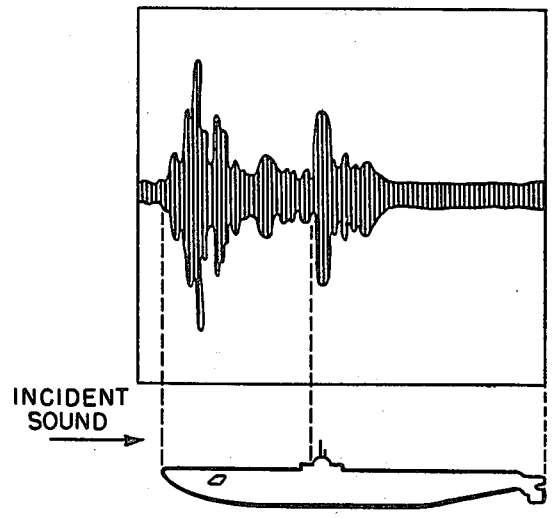

Within a degree or two of bow the back portion of this echo pattern of a single transmitted pulse disappears, leaving only a shortened echo. When this occurs, the third highlight disappears completely but the front part of the echo pattern remains intact with two highlights corresponding to the bow and the conning structure, as is shown in FIG. 4. This shortening was also apparent on the recorder trace of FIG. 2. It appears to be due to an acoustic shadow cast by the conning tower over the stern control surfaces. Such a shadow would be formed in much the same way as the common shadow encountered from light beams. The elevation angle of incidence of the sound beam then should be important in the formation of this shadow. This effect has actually been observed at sea and recorded on film. At a range of 800 yards and with the submarine at periscope depth, the shadowing occurs over an approximate 4° sector centered upon the bow, but at the same range and a 250 foot depth the shadow is only observed over a ½° sector. Because of the narrow sector, the shortened echo affords an easy means of accurately determining bow aspect and thus the heading of the submarine.

A sequence of echoes observed while crossing the bow of the submarine reveals this same pattern of the three highlights interrupted only by the shadowing directly at bow aspect (FIG. 4) and shows how marked and easily recognizable this structure is, even without the scale model submarine to emphasize its significance. On all of the echo pictures illustrated the sweep of the oscilloscope has been accurately timed and the time interval has been converted into the units of range reading from 0 to 350 feet, to bring out the consistency both in the positioning of the highlights and in the length of the echo. The sweep time is chosen to be compatible with known target dimensions.

Figure 5:
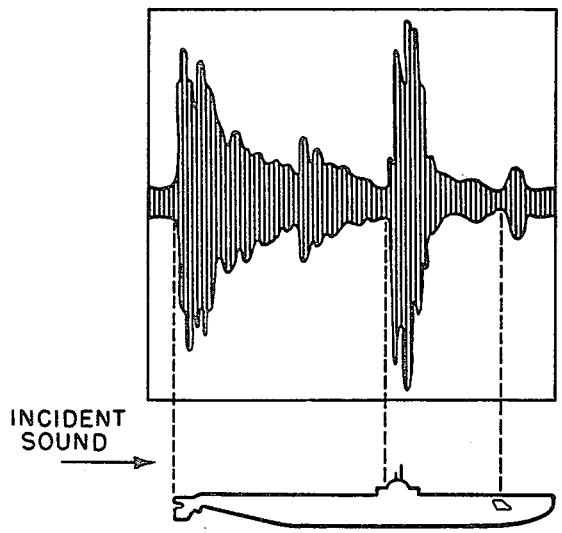

Stern aspect should show a complete reversal in this echo structure pattern of a single transmitted pulse. The scope trace of FIG. 5, observed a few degrees off stern aspect, confirms this. Here again there are three echo highlights, but in reversed order they now correspond to the areas about stern control surfaces, the conning structure, and the bow planes respectively. The position of the middle highlight has shifted and it is now much closer to the end than the start of the echo. This again is due to the conning structure being located closer to the bow than the stern in this particular type of submarine. If it were in the center of the submarine there would be no shift of this highlight between bow and stern aspects. This shift then affords an excellent means of distinguishing between bow and stern. When the middle highlight is near the front of the echo, the aspect is bow, and when it is near the end of the echo, the aspect is stern. This echo structure pattern at stern is also observed over a sector of approximately 15° centered on the stern.

Figure 6:
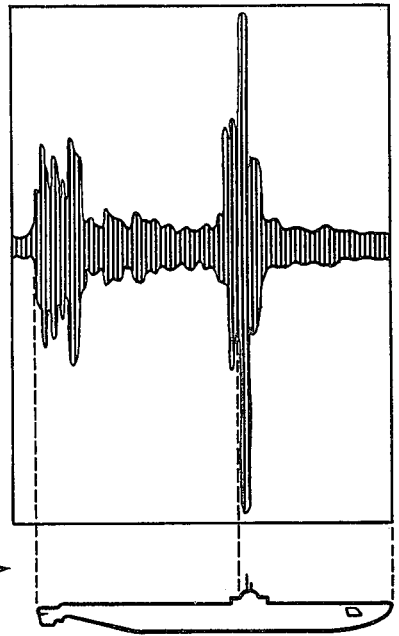

Shadowing also occurs at stern aspect as is shown in FIG. 6. Here the shortening of the echo of a single transmitted pulse is not as great because the conning structure is farther from the stern leaving only a short portion of the submarine to fall within the shadow zone. The front part of the echo remains intact and still contains the two highlights corresponding to the stern control surfaces and the conning structure. The sector in which the shortened echo is observed at stern is also dependent upon the altitude angle. At periscope depth and an 800-yard range, it occurs in a sector of approximately 4° centered on the stern.

The sequence of echoes observed while crossing the stern also shows a structural pattern which is distinctive and constant both in the positioning of the highlights and the length of the echoes. The appearance of the shadow (FIGS. 4, 6) is not essential for classification of a submarine echo at bow or stern because this can be done through the observation of the three highlights combined with a knowledge of the echo length. However, observing the shadow both confirms the classification and gives a sharp indication of bow and stern aspects, and thus the submarine's heading.

Beam aspect does not present a striking array of highlights but it is easily distinguishable for its short, sharp structure. At beam, as was shown on the recorder trace, the echo length is a minimum. On the surface the echo length is about 20 feet, or slightly less than the width of the submarine—27 feet for a fleet-type submarine. This is to be expected since the deck is out of the water, and underneath, the far side of the submarine would be shadowed by the curvature of the hull. At periscope depth and deeper the echo contains two parts—a solid high amplitude segment followed by a very low level portion which fades into the background. The initial high amplitude part corresponds closely to the width of the submarine. The recorder indicates the entire width and thus shows an echo two or more times the width of the submarine. Whatever the cause of this low level elongation, it does not hinder the recognition of beam aspect since any consistent method of measuring the echo length shows it to be a minimum precisely at beam.

Figure 7:
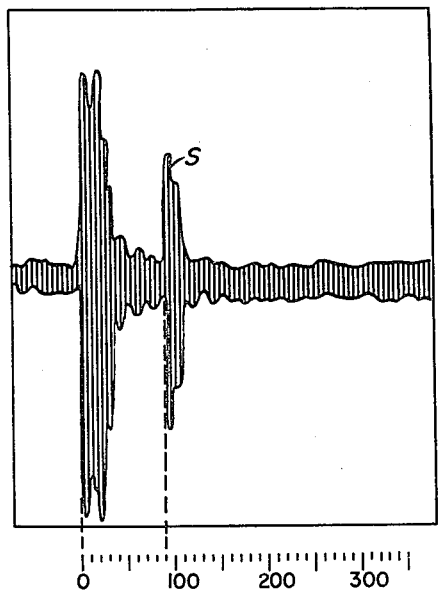

When the submarine is below a depth of about 70 feet, the appearance of a water surface-reflected submarine echo gives another means of positive submarine classification. In FIG. 7 the beam echo of a single transmitted pulse observed at a 90-foot depth is followed by a surface echo S. The surface echo has been observed only from submarines when the aspect was close to beam. The surface echo also gives an accurate determination of the submarine's depth. The depth is determined by measuring the range from the front of the main echo to the front of the surface echo. A more complete description of this surface echo and its use in determining submarine depth is given in the co-pending application of L. R. Padberg Jr. Ser. No. 511,136, filed May 25, 1955, now U.S. Pat. No. 3,290,643.

At aspects between bow, beam, and stern, there are no long sequential patterns of echo highlights to pinpoint individual aspects. The broad echo with three highlights observed just off the bow gradually changes to the short, sharp structure observed at beam. Going on around the sub the echo gradually lengthens until the broad, distinctive stern structure develops. This change in echo length is adequately shown on the recorder, but there the echoes are shown as smears with the complex structural information partially hidden.

Figure 8:
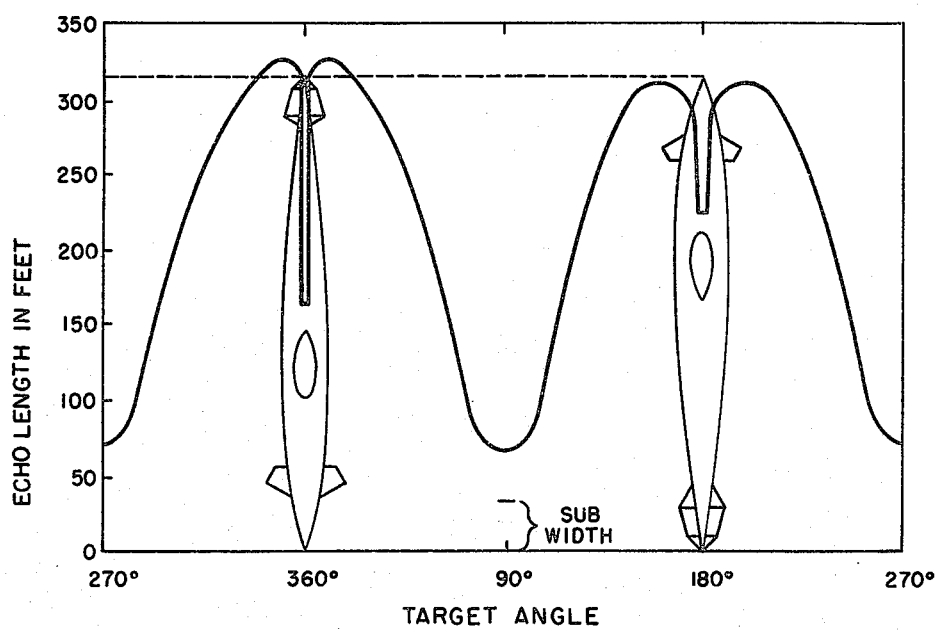
FIG. 8 is a graph of the relation between echo length and target angle.

Except for a brief shadowing at bow and stern aspects, the echo length follows a very cyclic pattern as the submarine is circled. This can be seen in FIG. 8, where the echo length varies from a maximum near bow to a minimum at beam and back to a maximum near stern. Information such as this on the maximum and minimum echo lengths to be expected can greatly aid in classification. Any echoes appreciably longer or shorter than those expected from a submarine can be immediately eliminated. Once the length of a submarine target has been determined by some means such as crossing the bow or stern, measurement of the echo length can narrow down the determination of target angle to one of four small sectors, stern, bow, port or starboard beam.

The graph also emphasizes several points already brought out. It shows the abruptness with which the shadow is formed, both at bow and stern. At bow (360°) the length of the shadowed echo corresponds to the distance from the bow to just aft of the conning structure, while at stern it corresponds to the distance from the stern to just forward of the conning structure. At beam the entire echo length is over twice the width of the submarine. This is a graph meant to show the value of such information and is not meant to give an absolute value of echo length for any single aspect. The graph was made using data obtained from one circle containing over 900 consecutive echoes.

All of the echoes disclosed herein have been recorded directly off the transducer, using no filters but only a broadband amplifier. The only filtering present was that furnished by the transducer itself. This was done to avoid distortion. Gains in signal-to-background ratio can be realized when optimum filtering is utilized. The 3 ms pulse has been found to give the most usable information. 10 ms is too long and tends to smear parts of the echo together while pulses of less than 1 ms give the echo such a spiney structure that it appears fuzzy and impossible to read accurately. Circling runs were made using both 10 and 14 kc carrier frequency and no difference in echo characteristics was noted between the two frequencies.

In the practice of the method of this invention the expanded oscilloscope XA is gated at the target range which has been determined through the usual direction and ranging procedures. The gating is effected by suitable means such as the recorder disclosed in the co-pending application of F. Parker et al, Ser. No. 493,586, filed Mar. 10, 1955, which causes the sweep of the cathode ray tube of oscilloscope XA to be initiated prior to the time of reception of the leading edge of the echo and to be terminated after a full sweep shortly after the time of reception of the trailing edge of a maximum length submarine echo. As indicated in FIGS. 3–6 the fast sweep of the gated scope will have a duration which approximately corresponds to twice the time required for the acoustic energy pulses to travel a distance slightly greater than the length of a submarine. The echo structure is observed and measured by suitable scales which may be provided on the recorder and the oscilloscope. Any echo which is not of a length between the known maximum and minimum submarine echo lengths may immediately be discarded as being non-submarine. The measurements may be compared with known patterns such as those of FIGS. 3–7. A single pattern such as that of either FIG. 3 or FIG. 5 will conclusively identify the target as a submarine detected at bow or stern aspect respectively. Circling of the target for 90° or more may then be initiated to obtain from a submarine target a recorder trace such as shown in FIG. 2. The progressive change in echo length from maximum to minimum, the break up of the maximum length echoes in the vicinity of bow and stern aspects, and the shadowing or sharp decrease in length exactly at bow or stern are other factors which ensure proper classification of the target by means of either recorder or oscilloscope. It is to be understood that the the pulses repetitively generated during this operation must be of the critical length between 1 and 10 ms. At beam aspect the appearance of the surface echo which is obtained solely from a submarine target provides still another positive identification of the target as submarine.

It will be readily appreciated that the equipment illustrated in FIG. 1 is but one form of apparatus with which the method of this invention may be practiced. For example, the two oscilloscopes may be replaced by a single oscilloscope having two electron guns or having a variable rate sweep or classification information could be obtained by magnification of the recorder trace or providing a gated recorder with faster stylii traverse.

Obviously many modifications and variations of the present invention are possible in the light of the above teachings. It is therefrom to be understood that within the scope of the appended claims the invention may be practiced otherwise than as specifically described.

What is claimed is:

1. A method for distinguishing between submarine and non-submarine sonar targets comprising the steps of producing a series of permanent displays of sonar target echoes having fixed electrical characteristics by projecting a beam of energy pulses of more than one and less than ten milliseconds duration toward a known submarine target of predetermined range along a number of converging paths, then transmitting a succession of energy pulses of the same duration toward an unknown target along a number of converging paths, producing successive signals of durations which successively vary in accordance with the extent of said target along consecutive pulse paths, indicating the maximum and minimum signal duration, and gating a series of sonar echo displays responsive to the same electrical characteristics as those producing the permanent displays, of said unknown target between said maximum and minimum signal duration whereby a homologous echo production of the permanent displays is obtained only when echo is from said submarine type.

2. The method of claim 1 including the step of producing a signal indicative of a water surface echo from said target reflected along the path of minimum signal duration.

3. The method of claim 1 wherein said step of indicating signal duration comprises the steps of successively recording consecutively produced signals.

4. The method of identifying a sonar target as submarine or non-submarine comprising the steps of projecting a beam of energy pulses of more than one and less than ten milliseconds duration for producing a permanent display of a sonar target echo having fixed electrical characteristics and representing a submerged submarine of a predetermined physical characteristic type, transmitting a succession of acoustic energy pulses of more than one and less than ten milliseconds duration from an underwater transducer toward a submerged target along a number of converging paths from a transmitter while circling said target, tracing the echo pulses received by said transducer from said target on a range recording device while circling said target for determining the shortest echo of target range a beam aspect, and gating a sonar echo display device at beam aspect operatively responsive to the same electrical characteristics producing said permanent display whereby a homologons reproduction of a characteristic submarine is provided only when said echo is from said submarine type.

5. The method of claim 4 including the step of producing a signal indicative of a water surface echo from said target reflected along the path of minimum signal duration at beam aspect.

* * * * *